Dec. 21, 1943.  C. F. MAUTE  2,337,400
TOOL HOLDING DEVICE
Filed Oct. 22, 1942
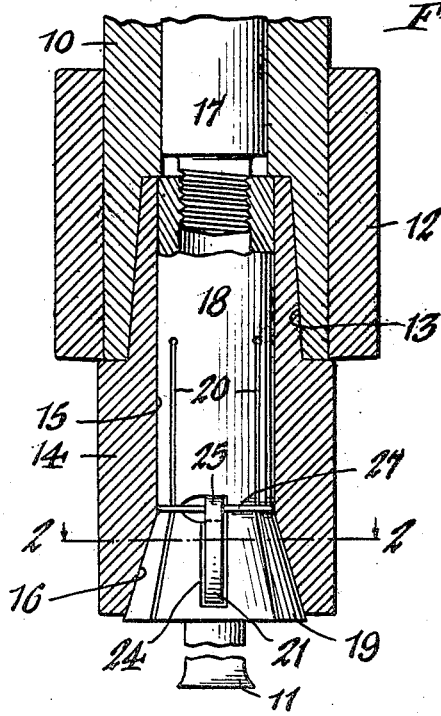
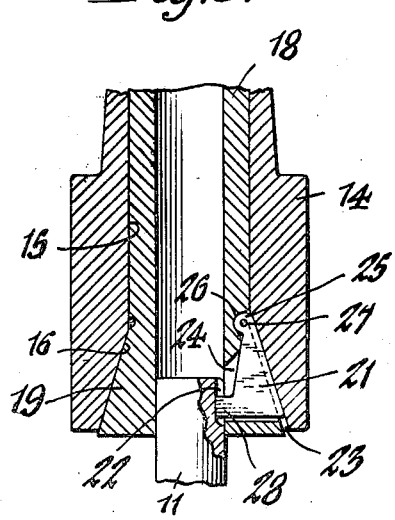
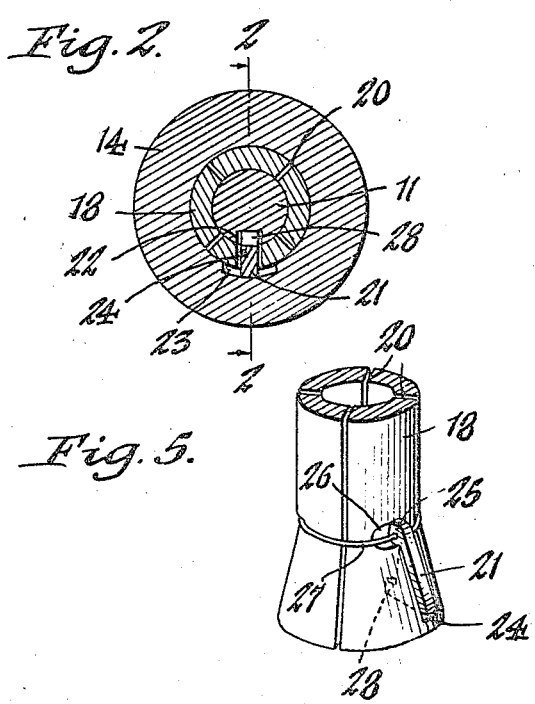
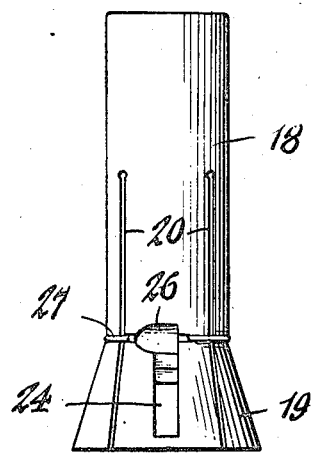
Inventor,
Carl F. Maute,
by Walter P. Geyer
Attorney.

Patented Dec. 21, 1943

2,337,400

UNITED STATES PATENT OFFICE 2,337,400

TOOLHOLDING DEVICE

Carl F. Maute, Buffalo, N. Y.

Application October 22, 1942, Serial No. 462,987

4 Claims. (Cl. 279—53)

This invention relates generally to certain new and useful improvements in machine tool holding devices and more particularly to a tool holder for end mill cutters and the like.

It has for one of its objects to provide a holder for machine tools which is so designed as to effectually and positively retain the tool in its operative driving position and which permits the ready application of the tool to and its removal from the machine in a minimum period of time.

Another object of the invention is to provide a tool holder of this character having a novel collet construction including a pendant or pivoted key so disposed as to extend into the bore of the collet as well as exteriorly thereof to simultaneously engage and interlock with the shank of the tool and a sleeve or adapter surrounding the collet.

Other features of the invention reside in the construction and arrangement of parts hereinafter described and particularly pointed out in the appended claims.

In the accompanying drawing:

Figure 1 is a sectional view of the revolving spindle of a machine tool showing my improved tool holder in association therewith. Figure 2 is an enlarged horizontal section taken on line 2—2, Figure 1. Figure 3 is a fragmentary vertical section taken on line 3—3, Figure 2. Figure 4 is a side elevation of the collet with the pivoted key removed. Figure 5 is a fragmentary perspective view of the collet and its key assembled thereon.

Similar characters of reference indicate corresponding parts throughout the several views.

By way of example, my invention has been shown in association with the revolving spindle 10 of a machine tool equipped with an end mill cutter 11, the spindle being hollow and journaled in the housing 12 of the tool. Fitted to the lower end of the spindle in a tapered counter-bore 13 thereof and in driving engagement therewith is a sleeve or adapter 14 having a straight bore 15 terminating at its lower end in a downwardly-flaring counter-bore 16. A draw bar or bolt 17 extends through the bore of the spindle 10, bearing at its upper headed end thereon and in adjusted threaded connection at its lower end with the upper threaded end of a collet 18 which is fitted in the straight bore of the adapter 16 and terminates at its lower end in a downwardly-flaring gripping jaw portion 19 conforming to the shape of the adapter counter-bore 16, so that when the draw bar is tightened, the collet is thrust upwardly in firm gripping engagement with the adapter and with the cutter 11.

The collet 18 is provided with a plurality of longitudinal slits 20 which extend upwardly from the lower end thereof to provide resulting gripping jaws therebetween. Applied to one of the jaws of the collet is a dual-purpose key 21 which, in the operative position of the parts, is adapted to interlock at its inner and outer edges with a key-way 22 in the tool-shank and a key-way 23 in the adapter, respectively, to insure a positive driving connection between the revolving spindle and the tool. The key is a pendant one to swing transversely in a slot 24 formed in the flaring portion 19 of the collet between adjoining slits 20 for registering engagement with the opposing key-ways 22, 23. At its upper end this key has a pivot-hub 25 which is seated in a recess 26 formed in the collet at substantially the junction of its shank and flaring portion and which is detachably connected to a pivot 27 preferably in the form of a wire encircling the collet in the manner shown in Figure 5. The outer or adapter-engaging edge of the key is inclined so that it is substantially parallel to the flared portion of the collet 18 in the operative position of the parts to provide an extensive coupling connection with the key-way 23 in the adapter 14, while the lower end of the key terminates at its inner edge in a lug 28 which engages the key-way 22 in the shank of the tool 11.

By this construction, the collet 18 not only holds the cutting tool in proper alinement centrally of the spindle 10, but the key 21 provides a positive drive between the spindle and the collet as well as a positive lock between the latter and the cutting tool. In assembling the parts, the tool is inserted in the collet and the latter is then slipped with its tool into the adapter with the key-ways 22, 23 in radial alinement so as to register with the opposing gripping edges of the key, after which the parts are drawn tightly together by the draw bolt 17 into a unitary assembly.

I claim as my invention:

1. A collet for a machine tool, comprising a substantially tubular body terminating at its lower end in a downwardly-flaring portion and slit lengthwise to provide contractible jaws, the flared portion between adjoining slits having a transverse slot therein, and a key pivoted to said body in register with said slot and having gripping faces at its opposite edges extending beyond the exterior of the flared portion of the body and into the bore of the same.

2. A collet for a machine tool, comprising a substantially tubular body terminating at its lower end in a downwardly-flaring portion and slit lengthwise to provide contractible jaws, the flared portion between adjoining slits having a transverse slot therein, and a key pivoted to said body substantially at the junction thereof with its flared portion for movement in said slot and having inner and outer gripping edges adapted to project, respectively, into the bore of the body for engagement with the tool-shank and exteriorly of the tapered portion of said body with the rotary driven part of the machine tool.

3. A collet for a machine tool, comprising a substantially tubular body terminating at its lower end in a downwardly-flaring portion and slit lengthwise to provide contractible jaws, the flared portion between adjoining slits having a transverse slot therein terminating at its upper end in a pivoting recess formed in the contiguous exterior face of said flared portion, and a key having a pivotal hub at its upper end seated in said pivoting recess and having its remaining portion registering with said transverse slot to provide inner and outer gripping edges projecting, respectively, into the body-bore and exteriorly of the tapered portion of said body.

4. In a tool holder of the character described, the combination of a revolving spindle and an adapter in driving engagement therewith and having a key-way therein, of a collet for receiving a tool fitted in said adapter and having a transverse slot therein, and a pendant key pivoted to said collet in register with its slot to provide an outer gripping edge projecting exteriorly of the collet for engagement with the adapter key-way and an inner gripping edge projecting into the collet-bore for engagement with a companion key-way in the tool.

CARL F. MAUTE.